US011159804B1

(12) United States Patent
Strowe (10) Patent No.: US 11,159,804 B1
(45) Date of Patent: Oct. 26, 2021

(54) QOE FEEDBACK BASED INTELLIGENT VIDEO TRANSPORT STREAM TUNING

(75) Inventor: Robert Henry Strowe, Cumming, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 135 days.

(21) Appl. No.: 13/614,952

(22) Filed: Sep. 13, 2012

(51) Int. Cl.
| H04N 19/164 | (2014.01) |
| H04N 21/442 | (2011.01) |
| H04L 29/06 | (2006.01) |
| H04N 19/172 | (2014.01) |
| H04L 12/801 | (2013.01) |
| H04N 19/174 | (2014.01) |

(52) U.S. Cl.
CPC .......... *H04N 19/164* (2014.11); *H04L 65/80* (2013.01); *H04N 21/44209* (2013.01); *H04L 47/10* (2013.01); *H04N 19/172* (2014.11); *H04N 19/174* (2014.11)

(58) Field of Classification Search
None
See application file for complete search history.

(56) References Cited

U.S. PATENT DOCUMENTS

| 8,588,065 | B2* | 11/2013 | Liu ..................... H04L 41/5003 370/230 |
| 9,030,565 | B2* | 5/2015 | Yang .................... H04N 19/172 348/180 |
| 9,232,216 | B2* | 1/2016 | Raake .................. H04N 17/004 |
| 2002/0122422 | A1* | 9/2002 | Kenney ............... H04L 41/0213 370/392 |
| 2005/0094646 | A1* | 5/2005 | Lee .................... H04L 29/06027 370/395.52 |
| 2006/0056328 | A1* | 3/2006 | Lehane ................ H04L 45/02 370/315 |
| 2006/0090010 | A1* | 4/2006 | Qin ..................... H04N 17/004 709/246 |
| 2006/0285013 | A1* | 6/2006 | Lee et al. ............. H04N 9/475 348/515 |

(Continued)

FOREIGN PATENT DOCUMENTS

| EP | 2482558 A1 * | 8/2012 | ........... H04N 19/172 |
| WO | WO-2012139625 A1 * | 10/2012 | ......... H04L 41/5009 |

OTHER PUBLICATIONS

Florence Agboma and Antonio Liotta. 2008. QoE-aware QoS management. In Proceedings of the 6th International Conference on Advances in Mobile Computing and Multimedia (MoMM '08). Association for Computing Machinery, New York, NY, USA, 111-116. (Year: 2008).*

*Primary Examiner* — Stefan Gadomski
(74) *Attorney, Agent, or Firm* — Buchanan, Ingersoll & Rooney, PC (57) ABSTRACT

Various methods, systems, and apparatuses can be used to provide intelligent tuning based on quality-of-experience (QoE) feedback. In some implementations, an encoder can be modified to receive QoE feedback and subsequently adjust the transmitted output video signal. For example, based on a QoE feedback, an output compression rate can be optimized. In other implementations, an external intelligent monitor can be used to receive QoE feedback, compute output compression rate adjustments, and send adjustment commands to the encoder. Dynamically adjusting encoder parameters can reduce bandwidth while maintaining a high QoE.

11 Claims, 6 Drawing Sheets

(56) References Cited

U.S. PATENT DOCUMENTS

| | | | |
|---|---|---|---|
| 2007/0058635 A1* | 3/2007 | DaCosta | H04L 1/1877 370/394 |
| 2007/0133419 A1* | 6/2007 | Segel | H04L 47/10 370/236 |
| 2007/0239820 A1* | 10/2007 | Zhong | H04L 47/2416 709/201 |
| 2008/0064323 A1* | 3/2008 | Barda | H04B 7/18528 455/3.01 |
| 2009/0041114 A1* | 2/2009 | Clark | H04L 43/0829 375/240.01 |
| 2009/0238073 A1* | 9/2009 | Sanjeewa | H04L 43/0882 370/235 |
| 2010/0272210 A1* | 10/2010 | Kwon | H04L 27/183 375/295 |
| 2011/0090922 A1* | 4/2011 | Wang | H04L 65/4092 370/465 |
| 2011/0158184 A1* | 6/2011 | Agulnik | H04W 28/18 370/329 |
| 2011/0188374 A1* | 8/2011 | Zhou | H04L 12/2852 370/231 |
| 2011/0235542 A1* | 9/2011 | Li | H04L 1/20 370/252 |
| 2011/0279640 A1* | 11/2011 | Choi | H04N 7/148 348/14.12 |
| 2012/0039382 A1* | 2/2012 | Vonog | H04N 21/2343 375/240.01 |
| 2012/0195209 A1* | 8/2012 | Jain | H04L 41/0896 370/252 |
| 2012/0195324 A1* | 8/2012 | Raghuraman | H04L 47/00 370/431 |
| 2012/0201130 A1* | 8/2012 | Liu | H04L 47/782 370/230 |
| 2013/0003524 A1* | 1/2013 | Huang | H04L 1/1825 370/216 |
| 2013/0044224 A1* | 2/2013 | Liao | H04N 21/435 348/192 |
| 2013/0107741 A1* | 5/2013 | Huang | H04L 12/1863 370/252 |
| 2013/0208813 A1* | 8/2013 | Argyropoulos | H04N 17/004 375/240.26 |
| 2013/0262554 A1* | 10/2013 | Chen | H04L 65/605 709/201 |
| 2013/0263201 A1* | 10/2013 | Chung-How | H04N 19/89 725/116 |
| 2013/0293725 A1* | 11/2013 | Zhang | H04N 17/02 348/180 |
| 2014/0219088 A1* | 8/2014 | Oyman | H04N 21/23439 370/231 |
| 2014/0357993 A1* | 12/2014 | Hiriyannaiah | A61B 8/565 600/437 |

* cited by examiner

QOE FEEDBACK BASED INTELLIGENT VIDEO TRANSPORT STREAM TUNING

TECHNICAL FIELD

This disclosure relates to improving video transport stream tuning.

BACKGROUND

Traditionally, video quality and audio quality have been difficult for operators to predict. Thus, these quality metrics have been difficult to adequately handle. However, some metrics operate as a mechanism for audio/video (A/V) service providers to augment existing monitoring practices and generate meaningful subscriber centric, audio/video quality reports. One such metric for audio/video feedback is generically termed quality of experience (QoE). A QoE score can represent the general satisfaction level of a listener and/or viewer to a particular program or stream. In some examples, QoE is scored based on human perceptual analysis of numerous monitored programs in real-time. All QoE analysis is generally performed in the compressed domain.

In many modern A/V systems, various algorithms can be used to analyze, transcode, and transrate (i.e., modify bit rate) A/V signals. Such signals originate from a variety of A/V sources and are processed by A/V processors in networked devices called encoders. Quality analyzers can determine the A/V quality based on the absence or existence of video and/or audio defects such as, for example, missing video slices, audio silence, poor QoE scores, ETR-290 status, among many others. Operators currently estimate the best output rate setting and manually observe an A/V to determine if the signal is free of defects. However, an algorithm can be implemented that automatically and intelligently tunes encoder parameters based on QoE feedback.

BRIEF DESCRIPTION OF THE DRAWINGS

Like reference numbers and designations in the various drawings indicate like elements.

DETAILED DESCRIPTION

Encoders perform functions that can be adjusted based on many encoder parameters such as, for example, increasing compression of A/V signals to reduce network bandwidth, and thereby reduce costs for operators. Alternatively, if A/V quality is low, then an encoder parameter can decrease compression of A/V signals, thereby increasing bandwidth usage and increasing A/V quality. Currently, there is no mechanism to automatically adjust encoder compression rates or to tune other encoder parameters.

Various methods, systems, and apparatuses can be used to provide intelligent encoder tuning based on QoE feedback. In some implementations, an encoder can be modified to receive QoE feedback and subsequently adjust the transmitted output audio and/or video signal. For example, based on a QoE feedback, an output compression rate can be modified at the encoder based on signals received by logic that intelligently monitors QoE feedback from a networked device such as, for example, a quality analyzer. A quality analyzer can analyze video and/or audio signals and transmit QoE feedback metrics such as, for example, a QoE score and/or additional related defect codes. In some implementations, the QoE feedback can be gathered via simple network management protocol (SNMP) traps. In other implementations, the quality analyzer can transmit QoE feedback by another method such as, for example, proprietary signaling and/or register writes. In still further implementations, the encoder can contain a quality analyzer based on dynamic user feedback.

Systems and methods can also be used to provide a remote intelligent monitor can be used to receive QoE feedback, compute output compression rate adjustments, and send adjustment commands to an encoder. In some implementations, the intelligent monitor can reside in another networked device and transmit adjustments to the encoder. Once the audio/video transmission occurs from the encoder to the user, the quality analyzer can monitor errors in the video such as for example, missing video slices correlating to visual degradation. In some implementations, the quality analyzer can reside in a customer premise equipment (CPE) device such as, for example, a set-top box (STB) or gateway (GW). In other implementations, the quality analyzer can reside in another networked device. It should be understood that the quality analyzer can analyze compressed or uncompressed audio and/or video.

Once the QoE feedback is assembled and processed, the information is received by the intelligent monitor and is subsequently used to adjust characteristics at the encoder (i.e., encoder parameters). One such characteristic is the audio/video compression rate. The intelligent monitor can instruct the encoder to increase the audio/video compression, thereby reducing the bandwidth usage if the QoE feedback is within a certain quality range. In addition, the intelligent monitor can instruct the encoder to decrease the video compression, thereby increasing the video quality if the QoE feedback is outside a quality range. The quality range can be a programmable range. It should be understood that initial default compression rates can be used or defined by a user or operator. Dynamically adjusting compression rate or other encoder parameters can reduce bandwidth usage while maintaining a high QoE.

Figure 1:
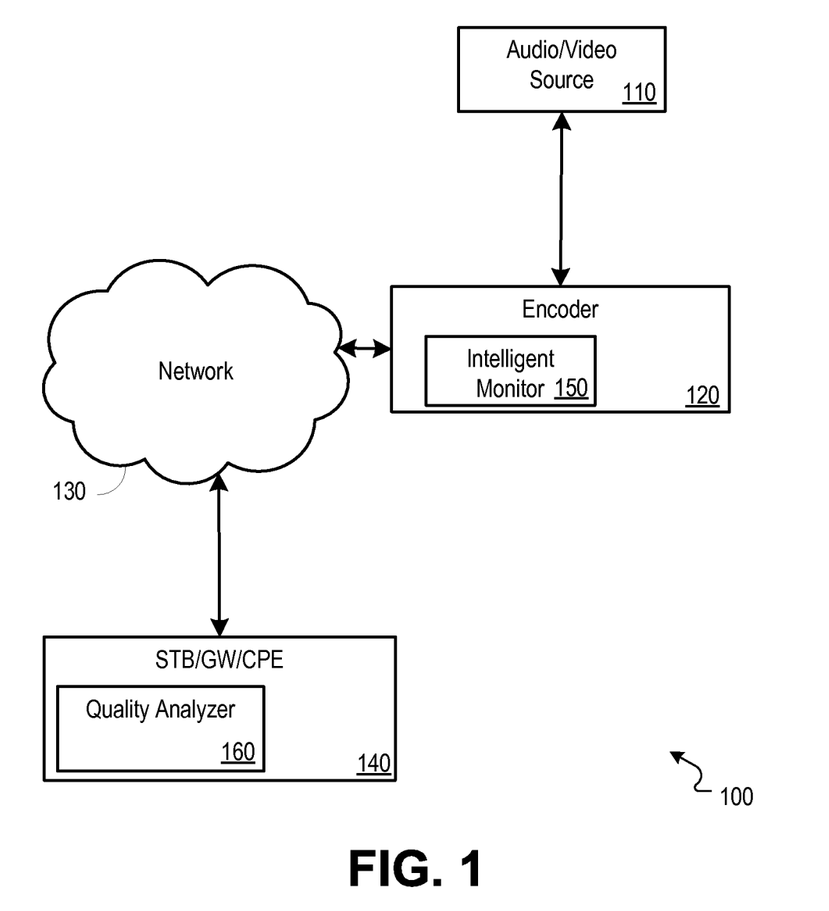
FIG. 1 is a block diagram illustrating an example network environment operable to provide intelligent encoder tuning based on QoE feedback with an integrated intelligent monitor.

FIG. 1 is a block diagram illustrating an example network environment operable to provide intelligent encoder tuning based on QoE feedback with an integrated intelligent monitor. In some implementations, an audio/video source 110 can transmit raw data to an encoder 120. Once processing and compression occurs at the encoder 120, the compressed audio/video data can be sent through a network 130. Various processing of the compressed data can occur between transmissions from the encoder 120 to a user device such as, for example, a STB, GW, CPE device 140, among many others.

In some implementations, an intelligent monitor 150 can operate to provide intelligent encoder tuning based on QoE feedback and can reside within the encoder 120. The intelligent monitor 150 implements algorithms that can automatically determine the best compression rate by increasing or decreasing the output rate of the encoder in a series of stepwise refinements. At each step, a quality analyzer 160 can measure the video and audio QoE data.

In some implementations, the quality analyzer 160 can be located within the STB/GW/CPE device 140. In other implementations, the quality analyzer 160 can be located in another networked device. The quality analyzer 160 can provide QoE feedback to the intelligent monitor 150 via the network 130. In some implementations, the intelligent monitor can receive the QoE feedback via an SNMP trap/event. In other implementations, another method such as, for example, a proprietary messaging format or out-of-band (OOB) channel can be used to transfer QoE feedback, among many others. It should be understood that QoE feedback can include an audio and/or video QoE score with associated defect codes that can be used to increase granularity and customization for adjustments to the compression rate(s) or other encoding parameters.

When the intelligent monitor 150 receives the QoE feedback from the quality analyzer 160, the intelligent monitor 150 could subsequently signal the encoder 120 to modify its compression rate in an iterative manner. In some implementations, the initial compression rate with the lowest rate and the absence of video/audio defects can be used until feedback is provided. In other implementations, the initial compression rate can be automated and based on initial estimates of video and audio quality. In still further implementations, the initial compression rate can be programmable. The QoE feedback can iteratively be collected and signaled back to the intelligent monitor 150 residing inside the encoder 120 in real-time. In some implementations, the adjustments of encoder parameters can be executed by software based on these real-time quality metrics. In other implementations, the adjustments can be performed by a hardware component or a field-programmable gate array (FPGA). It should be understood that in some implementations, the iteration can be triggered by a non-periodic event.

Figure 2:
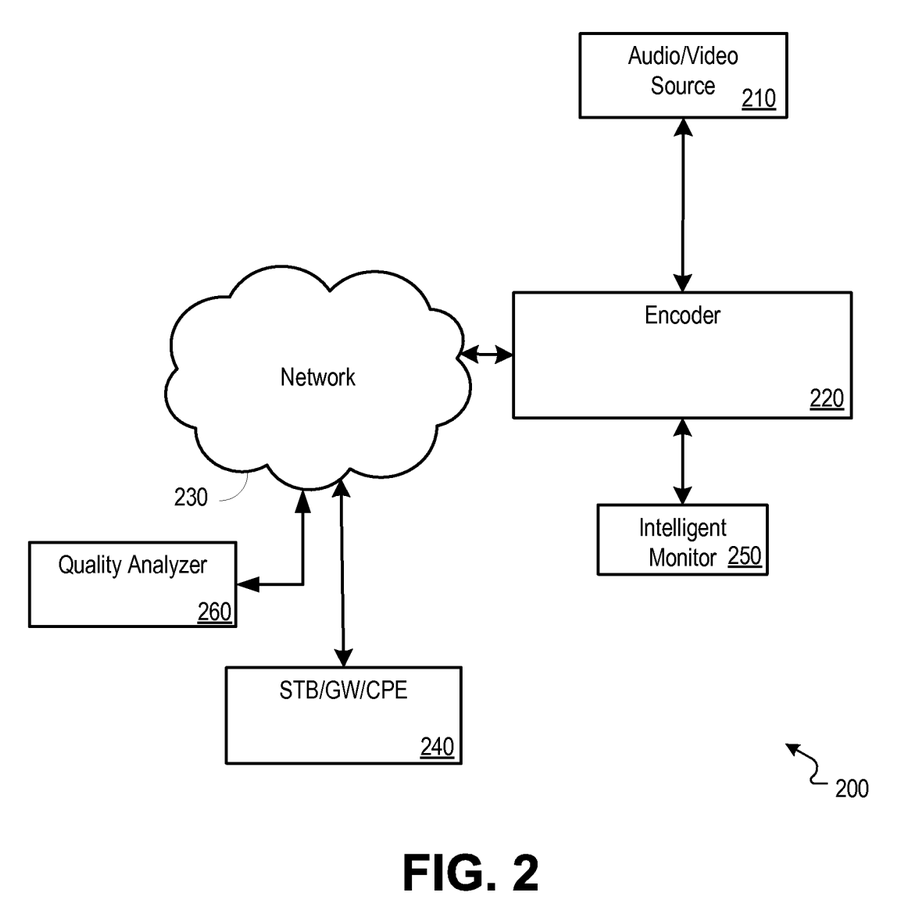
FIG. 2 is a block diagram illustrating an example network environment operable to provide intelligent encoder tuning based on QoE feedback with an independent intelligent monitor.

FIG. 2 is a block diagram illustrating an example network environment operable to provide intelligent encoder tuning based on QoE feedback with an independent intelligent monitor. In some implementations, an audio/video source 210 can transmit raw data to an encoder 220. Once processing and compression occurs at the encoder 220, the compressed audio/video data can be sent through a network 230. Various processing of the compressed data can occur between transmissions from the encoder 220 to a user device such as, for example, a STB, GW, CPE device 240, among many others.

In some implementations, an intelligent monitor 250 external to the encoder 220 can operate to provide intelligent encoder tuning based on QoE feedback. The intelligent monitor 250 implements algorithms that can automatically determine an efficient compression rate by increasing or decreasing the output rate of the encoder 220 in a series of stepwise refinements. At each step, a quality analyzer 260 can measure the video and audio QoE data.

In some implementations, the quality analyzer 260 can be located in another networked device. In other implementations, the quality analyzer 260 can be located within the STB/GW/CPE device 240. The quality analyzer 260 can provide QoE feedback to the intelligent monitor 250 via the network 230. In some implementations, the intelligent monitor can receive the QoE feedback via an SNMP trap. In other implementations, another method such as, for example, a proprietary messaging format or out-of-band (OOB) channel can be used to transfer QoE feedback, among many others. It should be understood that QoE feedback can include an audio and/or video QoE score with associated defect codes that can be used to increase granularity and customization for adjustments to the compression rate(s).

When the intelligent monitor 250 receives the signals from the quality analyzer 260, the intelligent monitor 250 could signal the encoder 220 to modify the compression rate or other encoding parameters in an iterative manner. In some implementations, when the QoE feedback is within a specific quality range, the compression rate can be increased, thereby conserving network bandwidth. The quality range can be predefined or programmable based on network characteristics. In other implementations, when the QoE feedback is outside a specific quality range, the compression rate can be decreased, thereby increasing bandwidth and audio/video quality. In some implementations, the quality range can be a threshold QoE value. In other implementations, the quality range can be a combination of audio and/or video QoE values used in conjunction with other QoE defect or error codes. The QoE feedback can iteratively be collected and continually signaled to the intelligent monitor 250 residing outside the encoder 220 in real-time. In some implementations, the compression rate adjustment can be executed by software based on these real-time quality metrics (e.g., QoE metrics). In other implementations, the adjustment can be executed by a hardware component or a field-programmable gate array (FPGA). It should be understood that in some implementations, the iteration can be triggered by a non-periodic event.

Figure 3:
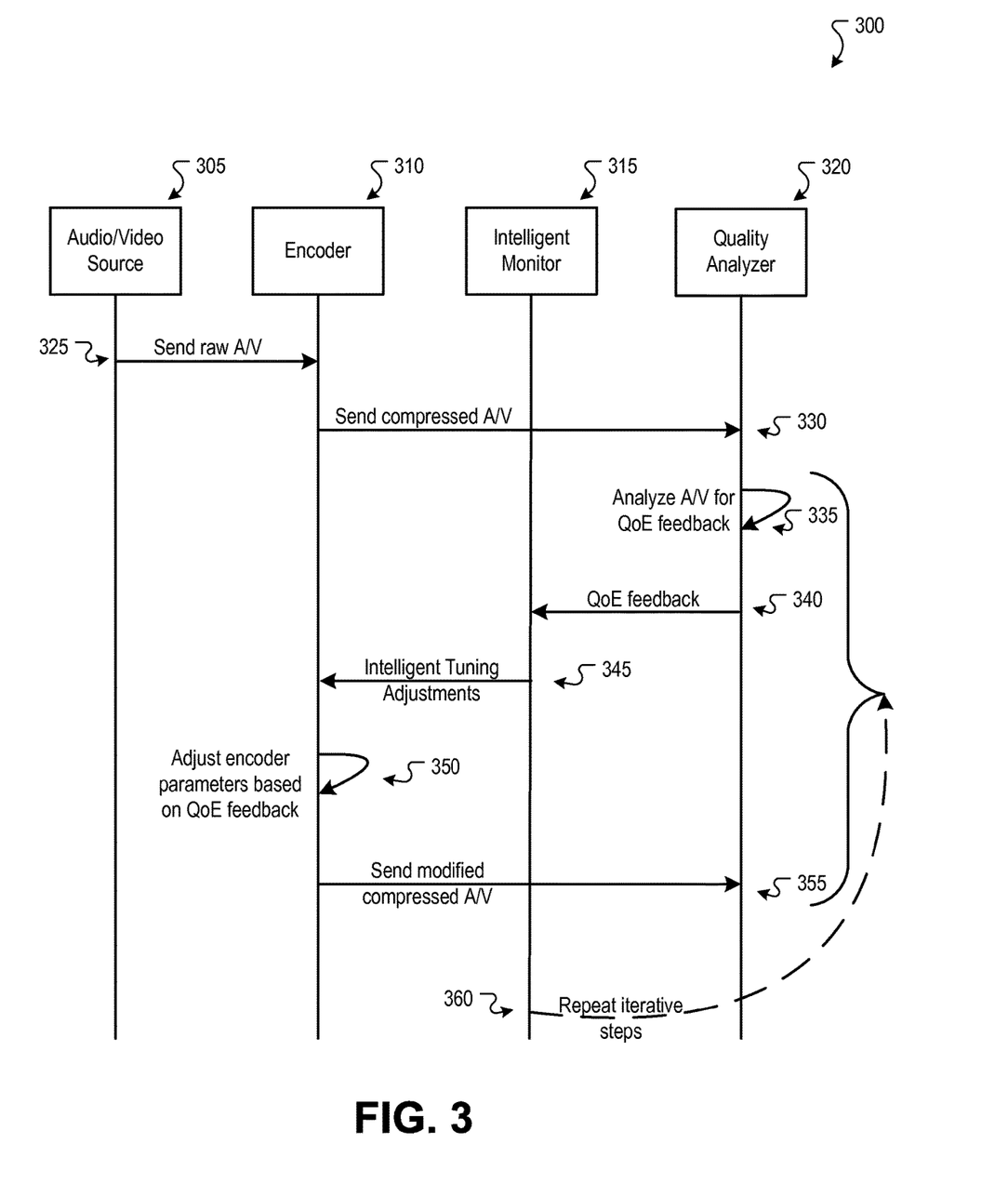
FIG. 3 is a sequence diagram illustrating an example method operable to provide intelligent encoder tuning based on QoE feedback.

FIG. 3 is a sequence diagram illustrating an example method operable to provide intelligent encoder tuning based on QoE feedback. The sequence diagram 300 can involve one or more audio/video source 305 (e.g., audio/video source 110 of FIG. 1 and 210 of FIG. 2) interactions with an encoder 310 (e.g., encoder 120 of FIG. 1 and 220 of FIG. 2), intelligent monitor 315 (e.g. intelligent monitor 150 of FIG. 1 and 250 of FIG. 2), and quality analyzer 320 (e.g. quality analyzer 160 of FIG. 1 and 260 of FIG. 2). In some implementations, the intelligent monitor 315 can reside in the encoder 310 or can be placed in another networked device external to the encoder 310. In additional implementations, the quality analyzer 320 can reside at the user's premise or placed in the network in another device.

The flow to provide intelligent encoder tuning based on QoE feedback can begin when an audio/video source 305 sends raw A/V to the encoder 310 (325). Example formats of raw audio/video can include formats such as, for example, HdMp2, SdMp2, or HdMp4, among many others. In some implementations, the audio/video source 305 can be a video server. In other implementations, the audio/video source 305 can be an antenna or cell tower. It should be understood that various hardware and/of software platforms can serve to provide the audio/video source 305.

In some implementations, when the encoder 310 receives the raw video from the audio/video source 305, the encoder 310 can compress the raw A/V and send the compressed A/V data to end users and monitoring devices such as a quality analyzer 320 (330). In some implementations, the initial encoder settings, such as compression rate, can be pre-set to yield the lowest bandwidth usage and the absence of video/audio defects. Those settings can then be used until feedback is provided. In other implementations, the initial encoder settings can be automated and based on initial estimates of video and audio quality. In still further implementations, the initial encoder settings can be programmable.

Once the quality analyzer 320 receives the compressed A/V, the quality analyzer 320 can analyze the A/V to generate QoE feedback (335). The quality analyzer 320 can generate defect codes in addition to a QoE score for audio, video, or both. The QoE feedback is then transmitted to the intelligent monitor 315 (340). In some implementations, the quality analyzer 320 will automatically transmit the QoE feedback to the intelligent monitor 315. In other implementations, the quality analyzer 320 will transmit the QoE feedback to the intelligent monitor 315 upon request. In some implementations, the intelligent monitor 315 can receive the QoE feedback via an SNMP trap. In other implementations, another method such as, for example, a proprietary messaging format or out-of-band (OOB) channel can be used to transfer QoE feedback, among many others. It should be understood that QoE feedback can include an audio and/or video QoE score with associated defect codes that can be used to increase granularity and customization for adjustments to the encoder settings.

The intelligent monitor 315 can then send intelligent running adjustments to the encoder to modify the encoder settings in an iterative manner (345). In some implementations, when the QoE feedback is within a specific quality range, the compression rate, for example, can be increased, thereby conserving network bandwidth. The quality range can be predefined or programmable based on network characteristics. In other implementations, when the QoE feedback is outside the quality range, the compression rate can be decreased, thereby increasing bandwidth and audio/video quality. In some implementations, the quality range can be a threshold QoE value. In other implementations, the quality range can be a combination of audio and/or video QoE values used in conjunction with other QoE defect or error codes. Once the encoder 310 adjusts the encoder settings (350), the modified compressed A/V is transmitted to end users and the quality analyzer 320 (355). It should be understood that subsequent modifications can occur in an iterative manner to adjust for changing network conditions. Such iterations can return to sequence 335 (360).

Figure 4:
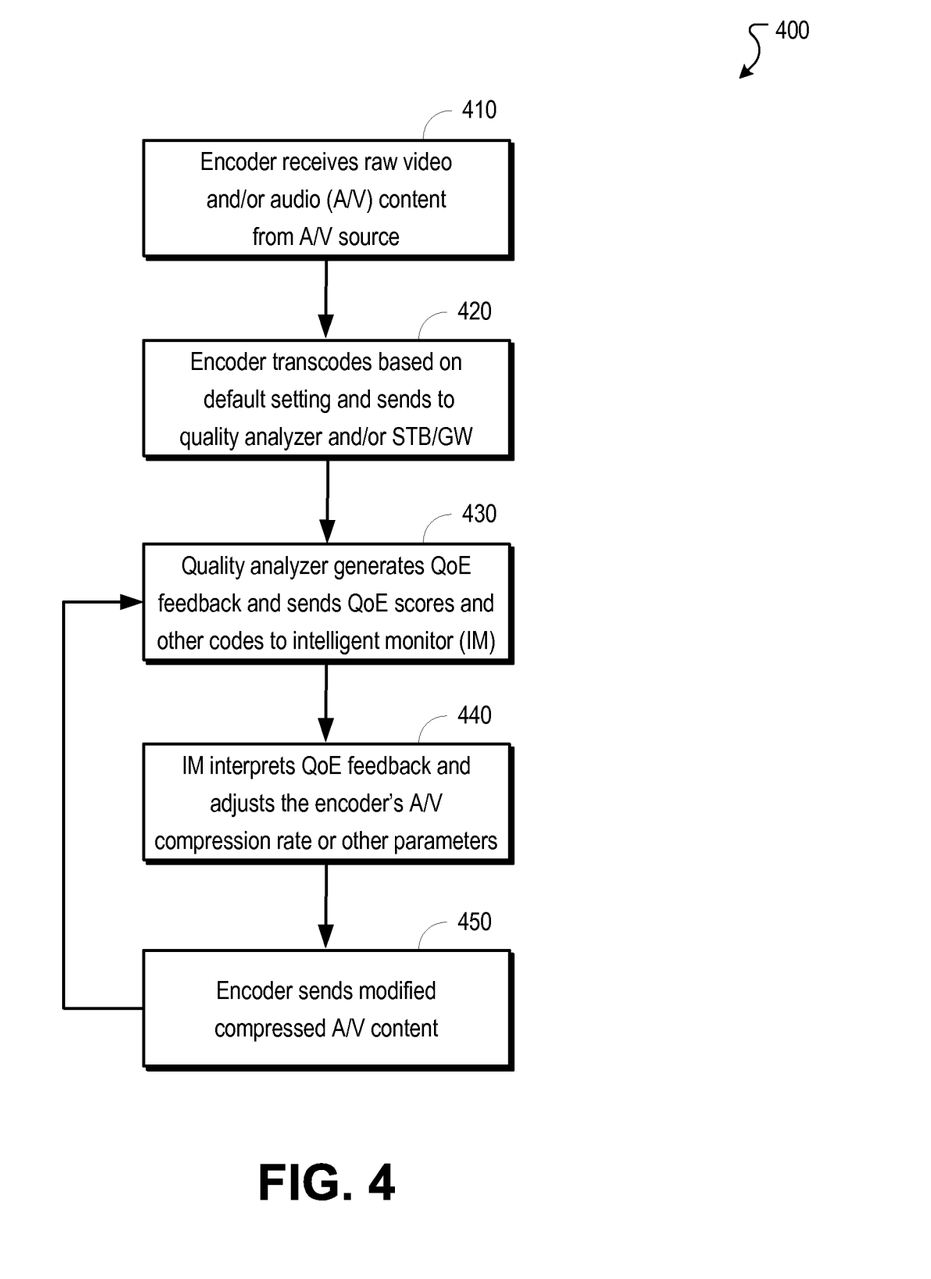
FIG. 4 is a flowchart illustrating an example process to provide intelligent encoder tuning based on QoE feedback.

FIG. 4 is a flowchart illustrating an example process to provide intelligent encoder tuning based on QoE feedback. This example process 400 begins at stage 410, when an encoder receives A/V content from an audio/video source. A/V content can be sent, for example, by an A/V source (e.g., A/V source 110 of FIG. 1 and 210 of FIG. 2 and 305 of FIG. 3) to an encoder (e.g., encoder 120 of FIG. 1 and 220 of FIG. 2 and 310 of FIG. 3). In some implementations, example formats of A/V content can include formats such as, for example, HdMp2, SdMp2, or HdMp4, among many others. In some implementations, the A/V source can be a video server. In other implementations, the A/V source can be an antenna or cell tower. It should be understood that various hardware and/of software platforms can serve to provide the A/V source.

At stage 420, the encoder transcodes A/V content based on default settings and sends A/V to quality analyzer and/or set-top box (STB) or gateway (GW). The transcoded A/V content can be generated, for example, by the encoder (e.g., encoder 120 of FIG. 1 and 220 of FIG. 2 and 310 of FIG. 3) and sent to the quality analyzer (e.g., quality analyzer 160 of FIG. 1 and 260 of FIG. 2 and 320 of FIG. 3) and/or STB/GW (e.g., STB/GW/CPE 140 of FIG. 1 and 240 of FIG. 2). In some implementations, the initial encoder settings may include compression to the lowest bitrate with an absence of video/audio defects that can then be used until feedback is provided. In other implementations, the initial encoder settings can be automated and based on initial estimates of video and audio quality. In still further implementations, the initial encoder settings can be programmable.

At stage 430, the QoE feedback is generated and a QoE score is sent and/or other code. The QoE feedback can be generated, for example, by the quality analyzer (e.g., quality analyzer 160 of FIG. 1 and 260 of FIG. 2 and 320 of FIG. 3), which can send QoE feedback to the intelligent monitor (e.g., intelligent monitor 150 of FIG. 1 and 250 of FIG. 2 and 315 of FIG. 3). In some implementations, the quality analyzer can be located within the STB/GW/CPE device. In other implementations, the quality analyzer can be located in another networked device. In some implementations, the intelligent monitor can receive the QoE feedback via an SNMP trap. In other implementations, another method such as, for example, a proprietary messaging format or out-of-band (OOB) channel can be used to transfer QoE feedback, among many others. It should be understood that QoE feedback can include an audio and/or video QoE score with associated defect codes that can be used to increase granularity and customization for adjustments to the compression rate(s).

At stage 440, the QoE feedback is interpreted and encoding settings are adjusted, for example, including the A/V compression rate. The QoE feedback can be interpreted, for example, by the encoder (e.g., encoder 120 of FIG. 1 and 220 of FIG. 2 and 310 of FIG. 3), which can modify A/V compression rate using the intelligent monitor (e.g., intelligent monitor 150 of FIG. 1 and 250 of FIG. 2 and 315 of FIG. 3) via a message or command. In alternative implementations, other encoder settings can be modified to adjust A/V content. The adjustment can be based on an A/V QoE score alone or in conjunction with other defect and error codes included from the QoE feedback from the quality analyzer.

At stage 450, the modified compressed A/V content is provided to a quality analyzer and/or STB/GW. The modified compressed A/V content can be generated, for example, by the encoder (e.g., encoder 120 of FIG. 1 and 220 of FIG. 2 and 310 of FIG. 3) and sent to the quality analyzer (e.g., quality analyzer 160 of FIG. 1 and 260 of FIG. 2 and 320 of FIG. 3) and/or STB/GW (e.g., STB/GW/CPE 140 of FIG. 1 and 240 of FIG. 2). In alternative implementations, other encoder settings can be modified to adjust A/V content. The process returns to stage 430, where QoE feedback is continually provided and adjustments are subsequently refined iteratively.

In some implementations, the QoE feedback can iteratively be collected and signaled back to the intelligent monitor residing inside the encoder in real-time. In other implementations, the adjustment of encoder settings can be executed by software based on these real-time quality metrics. In still further implementations, the adjustment can be executed by a hardware component or a field-programmable gate array (FPGA). It should be understood that in some implementations, the iteration can be triggered by a non-periodic event.

Figure 5:
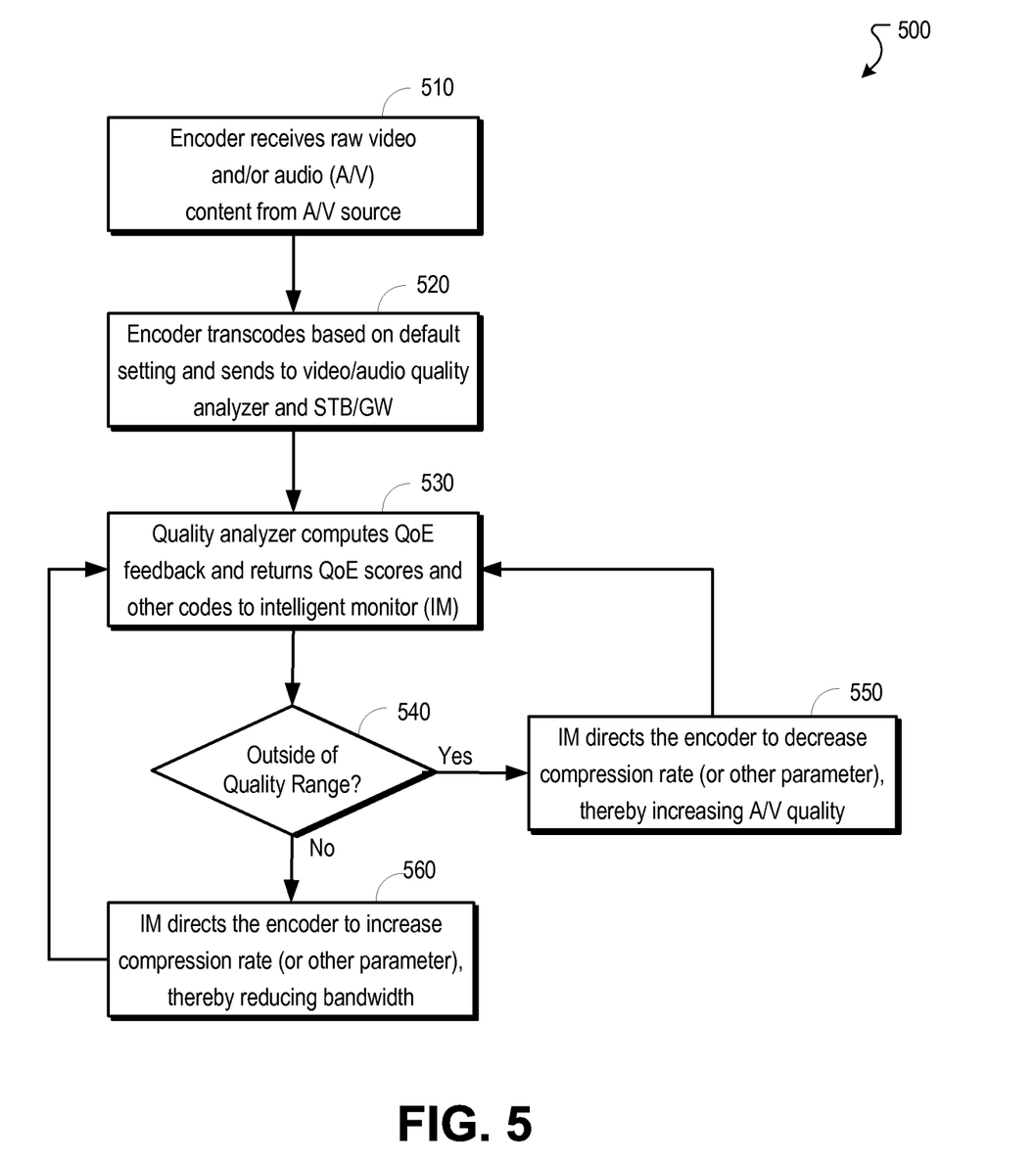
FIG. 5 is a flowchart illustrating an example process to provide intelligent encoder tuning based on QoE feedback with automated tuning.

FIG. 5 is a flowchart illustrating an example process to provide intelligent encoder tuning based on QoE feedback with automated tuning. This example process 500 begins at stage 510, when A/V content is received. A/V content can be sent, for example, by an A/V source (e.g., A/V source 110 of FIG. 1 and 210 of FIG. 2 and 305 of FIG. 3) and received, for example, by an encoder (e.g., encoder 120 of FIG. 1 and 220 of FIG. 2 and 310 of FIG. 3). In some implementations, example formats of A/V content can include formats such as, for example, HdMp2, SdMp2, or HdMp4, among many others. In some implementations, the A/V source can be a video server. In other implementations, the A/V source can be an antenna or cell tower. It should be understood that various hardware and/of software platforms can serve to provide the A/V source.

At stage 520, A/V content is transcoded based on default settings and sends A/V to a quality analyzer and/or set-top box (STB) or gateway (GW). The transcoded A/V content can be generated, for example, by the encoder (e.g., encoder 120 of FIG. 1 and 220 of FIG. 2 and 310 of FIG. 3) and sent to the quality analyzer (e.g., quality analyzer 160 of FIG. 1 and 260 of FIG. 2 and 320 of FIG. 3) and/or STB/GW (e.g., STB/GW/CPE 140 of FIG. 1 and 240 of FIG. 2). In some implementations, the initial encoder settings may include compression to the lowest bit rate yielding the absence of video/audio defects, which can then be used until feedback is provided. In other implementations, the initial encoder setting decision can be automated and based on initial estimates of video and audio quality. In still further implementations, the initial encoder settings can be programmable in advance.

At stage 530, QoE feedback is generated and a QoE score and/or other codes are sent to the intelligent monitor (IM). The QoE feedback can be generated, for example, by the quality analyzer (e.g., quality analyzer 160 of FIG. 1 and 260 of FIG. 2 and 320 of FIG. 3), which can send QoE feedback (or other codes) to the intelligent monitor (e.g., intelligent monitor 150 of FIG. 1 and 250 of FIG. 2 and 315 of FIG. 3). In some implementations, the quality analyzer can be located within the STB/GW/CPE device. In other implementations, the quality analyzer can be located in another networked device. In some implementations, the intelligent monitor can receive the QoE feedback via an SNMP trap. In other implementations, another method such as, for example, a proprietary messaging format or out-of-band (OOB) channel can be used to transfer QoE feedback, among many others. It should be understood that QoE feedback can include an audio and/or video QoE score with associated defect codes that can be used to increase granularity and customization for adjustments to the encoder settings.

At stage 540, a determination is made whether the QoE score is outside a specific quality range. The determination can be made, for example, by the intelligent monitor (e.g., intelligent monitor 150 of FIG. 1 and 250 of FIG. 2 and 315 of FIG. 3). The quality range can be predefined or programmable based on network characteristics. In some implementations, the quality range can be a threshold QoE value. In other implementations, the quality range can be a combination of audio and/or video QoE value used in conjunction with other QoE defect or error codes.

If the QoE score is outside the quality range, then at stage 550, the encoder can be directed to decrease the compression rate, thereby increasing A/V quality. The adjustment in compression rate can be performed, for example, by the intelligent monitor (e.g., intelligent monitor 150 of FIG. 1 and 250 of FIG. 2 and 315 of FIG. 3). In some implementations, other QoE information such as, for example, defect codes can be used in conjunction with A/V QoE scores to adjust the compression rate. In alternative implementations, other encoder settings can be modified to adjust A/V content. The process returns to stage 530, where QoE feedback is provided and adjustments are subsequently refined iteratively. In some implementations, the QoE feedback can iteratively be collected and signaled back to the intelligent monitor residing inside the encoder in real-time. In other implementations, the compression rate adjustment can be executed by software based on these real-time quality metrics. In still further implementations, the adjustment can be executed by a hardware component or a field-programmable gate array (FPGA). It should be understood that in some implementations, the iteration can be triggered by a non-periodic event.

If the QoE score is within the quality range, then at stage 560, the encoder can be directed to increase the compression rate, thereby reducing network bandwidth. The adjustment in compression rate can be performed, for example, by the intelligent monitor (e.g., intelligent monitor 150 of FIG. 1 and 250 of FIG. 2 and 315 of FIG. 3). In some implementations, other QoE information such as, for example, defect codes can be used in conjunction with A/V QoE scores to adjust the compression rate. In alternative implementations, other encoder settings can be modified to adjust A/V content. The process returns to stage 530, where QoE feedback is provided and adjustments are subsequently refined iteratively. In some implementations, the QoE feedback can iteratively be collected and signaled back to the intelligent monitor residing inside the encoder in real-time. In other implementations, the compression rate adjustment can be executed by software based on these real-time quality metrics. In still further implementations, the adjustment can be executed by a hardware component or a field-programmable gate array (FPGA). It should be understood that in some implementations, the iteration can be triggered by a non-periodic event.

Figure 6:
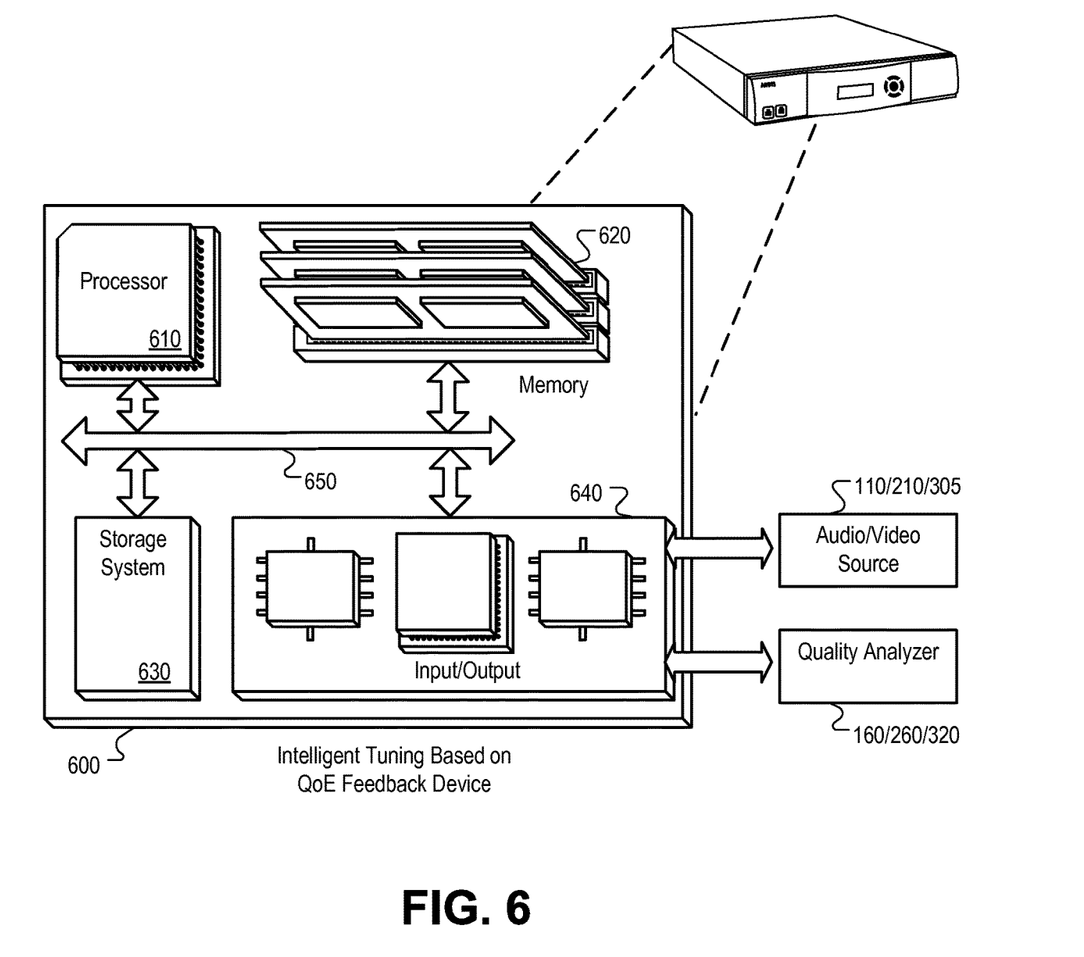
FIG. 6 is a component diagram of an example intelligent encoder tuning based on QoE feedback device.

FIG. 6 is a component diagram of an example device operable to perform intelligent tuning based on QoE feedback. The device 600 can include a processor 610, a memory 620, a storage device 630, and an input/output device 640. Each of the components 610, 620, 630, and 640 can be interconnected, for example, using a system bus 650. The processor 610 is capable of processing instructions for execution within the device 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the device 600. In one implementation, the storage device 630 is a computer-readable medium. In various different implementations, the storage device 630 can include, for example, a hard disk device, an optical disk device, flash memory or some other large capacity storage device.

The input/output device 640 provides input/output operations for the device 600. In one implementation, the input/output device 640 can interface to a video source 110/210/305 or a quality analyzer 160/260/320. In addition, such input/output device 640 can communicate with other external devices through various interfaces such as, for example, an IP network interface device, e.g., an Ethernet card, a cellular network interface, a serial communication device, e.g., and RS-232 port, and/or a wireless interface device, e.g., and 602.11 card. In another implementation, the input/output device can include driver devices configured to receive input data and send output data to other input/output devices (e.g., a video source 110/210/305 and/or a quality analyzer 160/260/320), as well as sending communications to, and receiving communications from various networks (not shown).

The device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A quality of experience (QoE) feedback based intelligent encoder tuning system, comprising:
 a packet network interface operable to receive, from a user computing device, a signal comprising both (a) an audio or video quality feedback and (b) one or more defect codes that are associated with the audio or video quality feedback, wherein the audio or video quality feedback comprises a QoE score that is generated by the user computing device and based on monitoring missing video slices by the user computing device, wherein the QoE score is generated based upon QoE data that is measured from compressed data received by the user computing device from the QoE feedback based intelligent encoder tuning system, and wherein the signal comprising the audio or video quality feedback is received from the user computing device via a Simple Network Management Protocol (SNMP) trap;
 a processor module operable to compare the received audio or video quality feedback to a specific quality range;
 wherein the processor module is operable to adjust an encoder parameter or setting based on the comparison between the audio or video quality feedback to the specific quality range, wherein the specific quality range is predefined based upon network characteristics and comprises a threshold QoE value, wherein the encoder parameter or setting comprises an initial encoder setting, the initial encoder setting comprising a compression rate that yields a lowest bandwidth usage and an absence of video/audio defects, wherein the processor module adjusts the encoder parameter or setting in an iterative manner, the QoE feedback being received by the processor module iteratively in real-time, and wherein:
  the encoder parameter or setting adjustment results in compression rate increases when the audio or video quality feedback is within the specific quality range, wherein the amount by which the compression rate is increased is based upon the one or more defect codes; and
  the encoder parameter or setting adjustment results in compression rate decreases when the audio or video quality feedback is outside the specific quality range, wherein the amount by which the compression rate is decreased is based upon the one or more defect codes;
 wherein the audio or video quality feedback signal is received in real-time; and
 wherein the QoE feedback based intelligent encoder tuning system is automated, adjusting the encoder parameter without the input of a user or operator.

2. The intelligent encoder tuning system of claim 1, wherein the accepted quality range is programmable.

3. The intelligent encoder tuning system of claim 1, wherein the encoder parameters or setting initialize to default values.

4. A computer implemented method, comprising:
 receiving, from a user computing device, a signal comprising both (a) audio or video quality feedback and (b) one or more defect codes that are associated with the audio or video quality feedback via an interface, wherein the audio or video quality feedback comprises a QoE score that is generated by the user computing device and based on monitoring missing video slices by the user computing device, wherein the QoE score is generated based upon QoE data that is measured from compressed data received by the user computing device, and wherein the signal comprising the audio or video quality feedback is received from the user computing device;
 comparing the received audio or video quality feedback to a predetermined quality range, wherein the predetermined quality range is predefined based upon network characteristics and comprises a threshold QoE value;
 adjusting an encoder parameter or setting based on the comparison of the received audio or video quality feedback to the predetermined quality range via a processor, wherein the encoder parameter or setting comprises an initial encoder setting, the initial encoder setting comprising a compression rate that yields a lowest bandwidth usage and an absence of video/audio defects, wherein the encoder parameter or setting is adjusted in an iterative manner;
 wherein the adjusting to the encoder parameter or setting results in increasing the compression rate of an encoder when audio or video quality feedback is within the predetermined quality range, wherein the amount by which the compression rate is increased is based upon the one or more defect codes;
 wherein the adjusting to the encoder parameter or setting results in decreasing a compression rate of an encoder when audio or video quality feedback is outside the predetermined quality range, wherein the amount by which the compression rate is decreased is based upon the one or more defect codes;
 wherein the audio and video quality feedback signal is received in real-time; and
 wherein the method is automated, adjusting the encoder parameter or setting without the input of a user or operator.

5. The computer implemented method of claim 4, wherein the quality range is programmable.

6. The computer implemented method of claim 4, wherein the encoder parameters or setting initialize with default values.

7. The computer implemented method of claim 4, wherein the audio or video quality feedback signal is a QoE score.

8. A computer implemented method comprising:
 receiving, from a user computing device, a signal comprising both (a) audio or video quality feedback and (b) one or more defect codes that are associated with the audio or video quality feedback via an interface, wherein the audio or video quality feedback comprises a QoE score that is generated by the user computing device and based on monitoring missing video slices by the user computing device, wherein the QoE score is generated based upon QoE data that is measured from compressed data received by the user computing device, and wherein the signal comprising the audio or video quality feedback is received from the user computing device;

comparing the received audio or video quality feedback to a certain quality range, wherein the certain quality range is predefined based upon network characteristics and comprises a threshold QoE value;

adjusting an encoder parameter or setting based on the comparison of the audio or video quality feedback to the certain quality range via a processor, wherein the encoder parameter or setting comprises an initial encoder setting, the initial encoder setting comprising a compression rate that yields a lowest bandwidth usage and an absence of video/audio defects, wherein the encoder parameter or setting is adjusted in an iterative manner, and wherein:

the encoder parameter or setting adjustment results in compression rate increases when the audio or video quality feedback is within the certain quality range, wherein the amount by which the compression rate is increased is based upon the one or more defect codes; and the encoder parameter or setting adjustment results in compression rate decreases when the audio or video quality feedback is outside the certain quality range, wherein the amount by which the compression rate is decreased is based upon the one or more defect codes;

wherein the audio and video quality feedback signal is received in real-time;

wherein the method is automated, adjusting without the input of a user or operator.

9. The computer implemented method of claim 8, wherein the accepted quality range is programmable.

10. The computer implemented method of claim 8, wherein the encoder parameter or setting adjustment is performed from a remote device.

11. The computer implemented method of claim 8, wherein the audio or video quality feedback signal is a QoE score.

* * * * *